United States Patent [19]
Fricker

[11] Patent Number: 4,792,402
[45] Date of Patent: Dec. 20, 1988

[54] CONCENTRATION OF ALCOHOLIC BEVERAGES

[75] Inventor: Richard Fricker, Derby, England

[73] Assignee: A.G. (Patents) Limited, London, England

[21] Appl. No.: 933,979

[22] Filed: Nov. 24, 1986

Related U.S. Application Data

[63] Continuation of Ser. No. 667,484, Oct. 5, 1984, abandoned.

[30] Foreign Application Priority Data

Feb. 9, 1983 [GB] United Kingdom ............... 8303611

[51] Int. Cl.$^4$ ........................................... B01D 13/00
[52] U.S. Cl. ................................... 210/651; 210/652
[58] Field of Search ............... 210/651, 652; 426/592, 426/490, 494, 493

[56] References Cited

U.S. PATENT DOCUMENTS

4,499,117  2/1985  Bohheau ........................... 210/652

OTHER PUBLICATIONS

"The Recovery of Beer from Yeast and Other Processing Residues by Ultrafiltration", Cantrell, et al, Allied Breweries Ltd., 107 Station Street, Burton-on-Trent, Staffordshire, DE14, 1BZ, United Kingdom, pp. 691–698, 12–1987.

*Primary Examiner*—Frank Spear
*Attorney, Agent, or Firm*—Bacon & Thomas

[57] ABSTRACT

A method for concentrating alcoholic beverages which comprises subjecting the beverage to reverse osmosis to form a beverage concentrate, said reverse osmosis using a membrane which allows passage of water therethrough and is at least partially permeable to alcohol and volatile flavor components of the beverage but is impermeable to dissolved solids, subjecting the permeate from said reverse osmosis to distillation to separate therefrom alcohol and volatile flavor components of the beverage which have passed through the membrane, and combining the separate alcohol and volatile components with beverage concentrate from reverse osmosis. Apparatus for effecting this method is also described.

9 Claims, 1 Drawing Sheet

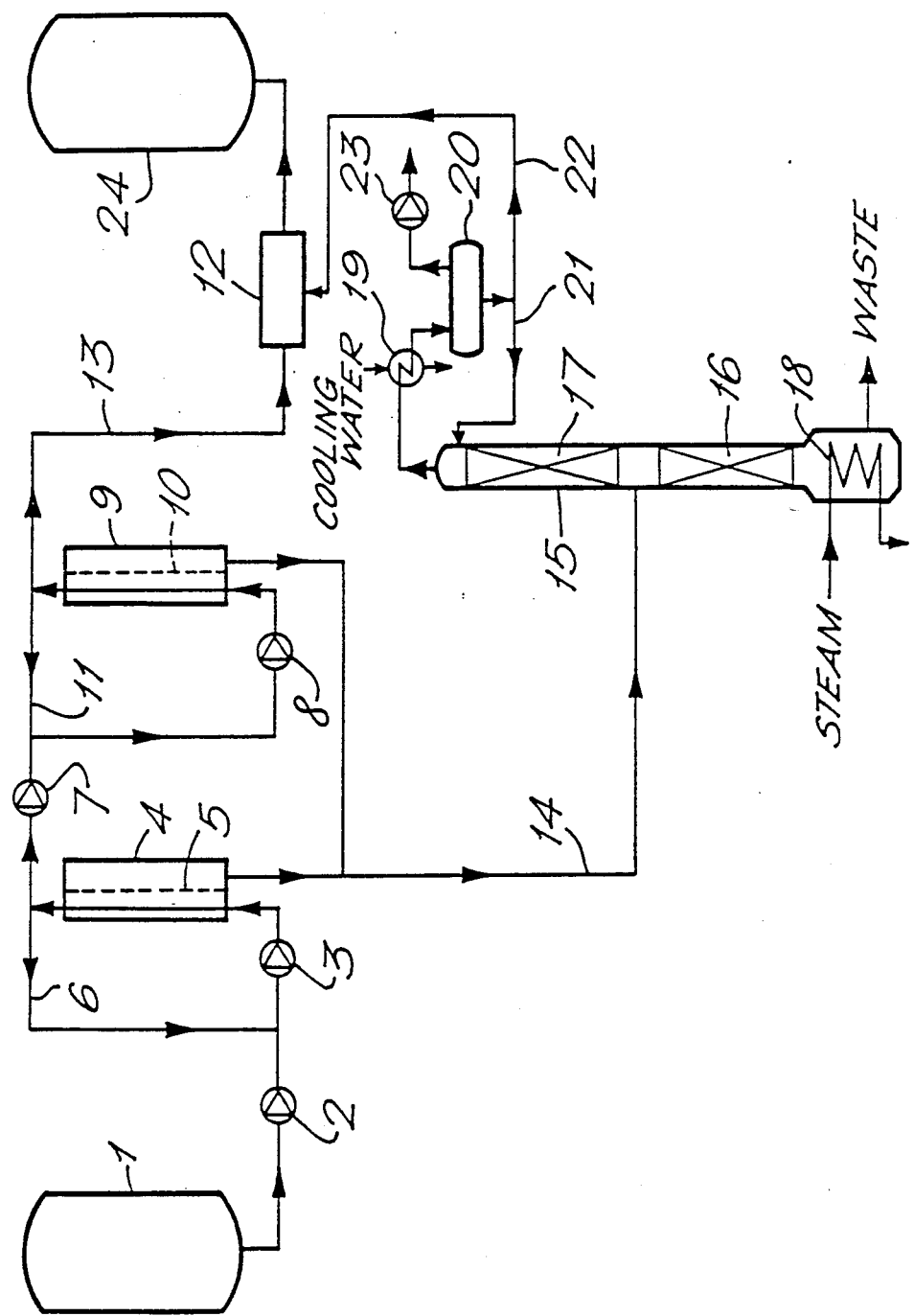

CONCENTRATION OF ALCOHOLIC BEVERAGES

This application is a continuation of application Ser. No. 667,484, filed Oct. 5, 1984, now abandoned.

BACKGROUND OF THE INVENTION

This invention relates to a method for the concentration of alcoholic beverages as well as to apparatus for use therein.

The major component of alcoholic beverages such as beer, lager, wine, cider, perry and the like, is water; for example, the water content of beer is often more than 90%. Since alcoholic beverages may be transported considerable distances, it has long been recognised that substantial transportation cost savings could be achieved if it were possible to reduce the water content of the beverage prior to transportation, e.g. at the manufacturing site, and then rehydrate the product after transportation. However, it is essential that the concentration process does not adversely affect the flavour characteristics of the beverage and considerable difficulties have been experienced in devising an acceptable concentration process.

One method for concentrating alcoholic beverages without adversely affecting their flavour which has generated considerable interest in the art uses the so-called "freeze concentration" process. In this process, water is separated from the beverage as ice crystals. However, this process involves high capital equipment and running costs. We have now found a method for concentrating alcoholic beverages without adversely affecting their flavour which possesses economic advantages both in capital and running costs.

SUMMARY OF THE INVENTION

Thus, in one aspect, the invention provides a method for concentrating an alcoholic beverage which comprises subjecting the beverage to reverse osmosis to form a beverage concentrate, said reverse osmosis using a membrane which allows the passage of water therethrough and is at least partially permeable to alcohol and volatile flavour components of the beverage, but is impermeable to dissolved solids, subjecting the permeate from said reverse osmosis to distillation to separate therefrom alcohol and volatile flavour components of the beverage which have passed through the membrane, and combining the separated alcohol and volatile flavour components with beverage concentrate from reverse osmosis.

The method according to the invention allows the preparation of an alcoholic beverage concentrate by a process which will not significantly affect the flavour characteristics of the beverage adversely. In particular, the use of reverse osmosis avoids the need to subject the greater part of the beverage (in particular the dissolved solids and other thermally sensitive compounds) to distillation; in general the relatively low molecular weight flavour components which pass through into the permeate are comparatively stable to distillation temperatures as compared with the other components of the beverage. However, in order to minimise thermal degradation, distillation of the permeate is preferably effected at subatmospheric pressure and thus at a temperature lower than the normal boiling point of the permeate.

In the reverse osmosis stage of the method of the invention, the alcoholic beverage may be passed under pressure to a reverse osmosis cell provided with a semipermeable membrane which allows the passage of water therethrough and which is at least partially permeable to alcohol and volatile flavour components of the beverage. In this way, a proportion of the water from the beverage is removed with the result that a concentrate of the beverage containing, inter alia, the dissolved solids is formed on one side of the semipermeable membrane, while a permeate consisting mostly of water but containing alcohol and volatile beverage flavour components is formed on the other side of the membrane. In order to reduce the load on the distillation apparatus, it may be desirable to use a semipermeable membrane which is partially impermeable to alcohol so that the permeate from the reverse osmosis stage has a reduced alcohol content. Semi-permeable membranes which may be used in the method of the invention and which have a degree of alcohol selectivity include, for example, the commercially available membrane Type ZF 99 manufactured and sold by Paterson Candy International Limited, Laverstoke Mill, Whitchurch, Hampshire, England. However, we have found that in some circumstances it may be preferable to use a membrane which is not alcohol selective, i.e. a membrane which is substantially totally permeable to alcohol, since this allows a greater concentration of the beverage in the reverse osmosis cell. An example of a membrane of this type is membrane Type T1/12W also manufactured and sold by Paterson Candy International Limited.

The method may be effected in batchwise or continuous operation. In batchwise operation, a starting volume of the beverage is recycled through one or more reverse osmosis cells until a desired concentration of the beverage is achieved, the cell permeate(s) being subjected to distillation and the separated alcohol and volatile flavour components combined with the beverage concentrate. In continuous operation, the beverage is passed through one or more reverse osmosis cells while beverage concentrate and permate are continuously removed and the latter subjected to distillation; if desired, a portion of the beverage concentrate is recycled through the cell(s) by mixing with incoming beverage. When two or more reverse osmosis cells are used, these may be coupled in series so that the concentrate from one cell is passed to the next and the permeates from the separate cells are subjected to distillation.

In the distillation stage of the method, the permeate from the reverse osmosis cell is passed to a distillation apparatus in order to separate alcohol and volatile beverage flavour components from the permeate. The distillation apparatus may consist of a conventional fractional distillation column and is preferably adapted for operation under reduced pressure. The column may be packed with an inert solid material such as raschig rings or suitable proprietary packing. In a preferred embodiment, the distillation apparatus consists of a steam stripping section and a rectification section. When working according to this preferred embodiment, the permeate is passed to the top of the steam stripping section, which comprises, for example, a packed column, and passes downwards. At the bottom of the column means are provided to heat the liquid, e.g. by live steam passing through a heating coil, and steam thereby formed passes upwardly through the decending liquid to strip alcohol and volatile flavour components therefrom. The vapour containing the alcohol and volatile flavour components from the top of the steam stripping section, which is significantly concentrated by this treatment, is then passed to the reflux section substantially to separate the alcohol and flavour components from water. If desired the steam stripping section and the reflux section may be combined together to form a single packed column with the permeate being fed to an intermediate position which effectively constitutes the top of the stripping section.

In order to avoid adversely affecting the flavour components in the vacuum distillation apparatus, it is desirable to operate at a pressure such that separation is effected at a relatively low temperature e.g. not greater than about 60° C. and preferably at about 55° C.

The vapour from the distillation apparatus consisting primarily of alcohol and volatile beverage components is condensed and the condensate may then be blended with beverage concentrate from the reverse osmosis to form the desired alcoholic beverage concentrate.

In a further aspect of the invention there is provided apparatus for the concentration of an alcoholic beverage which comprises means for passing the beverage to at least one reverse osmosis cell, said cell being provided with a membrane which will allow the passage of water therethrough and is at least partially permeable to alcohol and volatile flavour components of the beverage but is impermeable to dissolved solids, means to convey permeate from said reverse osmosis cell or cells to a distillation apparatus wherein alcohol and volatile flavour components of the beverage may be separated from said permeate, and means to combine separated alcohol and volatile beverage flavor components with beverage concentrate from said reverse osmosis cell or cells.

The distillation apparatus is preferably provided with means for operation at reduced pressure and temperature.

The alcoholic beverage which may be concentrated by the method and apparatus of the invention may, for example, be beer, lager, cider, wine, perry and the like. Where and when desired the concentrate may be reconstituted with water to form a beverage which is substantially identical with the initial alcoholic beverage.

BRIEF DESCRIPTION OF THE DRAWINGS

The invention will now be illustrated with reference to the figure of the accompanying drawing which schematically shows a preferred embodiment of apparatus according to the invention.

DETAILED DESCRIPTION

Starting alcoholic beverage may be pumped from storage vessel 1 via pumps 2 and 3 to first reverse osmosis cell 4. In the cell 4, the semi-permeable membrane 5 may have a degree of alcohol selectivity so that it allows passage of water while being partially impermeable to alcohol and volatile beverage flavour components. Alternatively, a membrane may be used which is not alcohol selective. A portion of the concentrate emerging from cell 4 is recycled to pump 3 via conduit 6, while the remaining concentrate is pumped via pumps 7 and 8 to second reverse osmosis cell 9 having a semi-permeable membrane 10 similar to membrane 5. A portion of concentrate emerging from cell 9 is recycled to pump 8 via conduit 11, while the remaining concentrate is passed to blender 12 via conduit 13.

The permeates from cells 4 and 9 are combined and passed via conduit 14 to vacuum distillation apparatus 15. Apparatus 15 consists of a packed column divided into a lower steam stripping section 16 and an upper rectifying section 17. The permeate is fed to a point i the apparatus 15 between these two sections. The liquid permeate passes down steam stripping section 16, while steam produced by heating the permeate at the bottom of section 16 by means of the heating coil 18, passes up section 16 to strip alcohol and volatile flavour components from the permeate. The vapour containing alcohol and the flavour components then passes up to rectifying section 17 where fractional distillation takes place. The packing of section 17 is such as to provide sufficient theoretical plates to allow the vapour emerging from the top of the column 15 to consist of alcohol and the volatile flavour components with a very small proportion of water. The vapour is condensed in condenser 19 and passed to reflux drum 20. A portion of the condensate may be recycled to the distillation column 15 via conduit 21 while the remaining condensate is conveyed to blender 12 via conduit 22.

A reduced pressure is maintained in the distillation apparatus by vacuum pump 23.

In blender 12, the beverage concentrate from the reverse osmosis is mixed with the condensate from the vacuum distillation apparatus to give a product concentrate which may be stored in holding tank 24.

The following Examples serve to illustrate the preparation of a beer concentrate according to the invention

EXAMPLE 1

100 Liters of beer were subjected to reverse osmosis. The beer was of a lager-type and had an initial specific gravity of 1.0065, a total dissolved solids content of 3.11% w/w and an ethanol content of 3.98% v/v. The reverse osmosis apparatus comprised a tubular outer jacket containing 18 longitudinal semi-permeable membrane tubes, each supported in perforated stainless steel tubes. The beer to be concentrated was passed through the membrane tubes in series at an applied pressure of 65 bar and permeate was withdrawn from the outer jacket. The membrane employed was of Type ZF99 supplied by Paterson Candy International Limited and the reverse osmosis apparatus had a total membrane surface area of 0.9 m$^2$.

The beer was recycled through the reverse osmosis apparatus until the concentration of total dissolved solids had risen to 12.41% w/w. The volume of the reverse osmosis concentrate thus obtained was 24.51 liters.

The permeate from the reverse osmosis apparatus was subjected to distillation in a packed column at a pressure of 350 torr so that the temperature did not rise above 60° C. at any point in the column. The column incorporated a steam stripping section containing 9 theoretical plates and a rectifying section containing 5 theoretical plates, and was equipped for controlled reflux of distillate to the rectifying section.

The rate of reflux was adjusted to produce a distillate having an ethanol concentration slightly in excess of 90% v/v, and the distillate then standardised to 90% v/v for comparison and measurement purposes. 1.42 Liters of alcoholic distillate were obtained.

The alcoholic distillate was combined with the reverse osmosis concentrate to give 25.82 liters of final beer concentrate having a specific grativty of 1.0265, a dissolved solids concentration of 11.86% w/w and an alcohol concentration of 15.45% v/v. The concentration factor achieved in this Example, based on the total dissolved solids contents of the final concentrate and startng beer, was 3.8.

EXAMPLES 2-5

In each of these Examples, 100 liters of the same beer employed in Example 1 were concentrated using the apparatus described in Example 1. In Example 2 the membrane employed in the reverse osmosis apparatus was Type ZF99, while the membrane used in Examples 3-5 was Type T1/12W also supplied by Paterson Candy International Limited.

The conditions employed and results obtained in Examples 1-5 are summarised in the following Table.

TABLE

|  | Example | | | | |
| --- | --- | --- | --- | --- | --- |
|  | 1 | 2 | 3 | 4 | 5 |
| Beer Starting Volume (liters) | 100 | 100 | 100 | 100 | 100 |
| Reverse Osmosis: | | | | | |
| Membrane type | ZF99 | ZF99 | T1/12W | T1/12W | T1/12W |
| Applied Pressure (bar) | 65 | 65 | 45 | 45 | 45 |
| Vol. of reverse osmosis concentrate (liters) | 24.51 | 16.92 | 18.97 | 10.18 | 26.81 |
| Total dissolved solids of concentrate (% w/w) | 12.41 | 17.66 | 15.68 | 27.69 | 11.27 |
| Vol. of distillate at 90% v/v ethanol (liters) | 1.42 | 1.80 | 3.25 | 3.86 | 3.24 |
| Final Concentrate: | | | | | |
| Vol. (liters) | 25.82 | 18.60 | 22.05 | 13.83 | 29.86 |
| Specific Gravity | 1.0265 | 1.0387 | 1.0321 | 1.0506 | 1.0221 |
| Total dissolved Solids (% w/w) | 11.85 | 16.39 | 13.31 | 21.58 | 10.37 |
| Alcohol content (% v/v) | 15.45 | 21.49 | 18.10 | 28.79 | 13.33 |
| Concentration factor (based on total dissolved solids) | 3.8 | 5.3 | 4.3 | 6.9 | 3.3 |

The concentrates obtained for each of the above Examples were reconstituted with carbonated water to the concentration of the original beer. In all cases there was no significant difference in taste or aroma between the original and reconstituted beers.

I claim:

1. A method for concentrating beer which comprises subjecting the beer to reverse osmosis to form a beer concentrate, said reverse osmosis using a membrane which allows the passage of water therethrough and is at least partially permeable to alcohol and volatile flavor components of the beer but is impermeable to dissolved solids, subjecting the permeate from said reverse osmosis to distillation to separate therefrom alcohol and volatile flavor components of the beer which have passed through the membrane, and combining the separated alcohol and volatile flavor components with beer concentrate from reverse osmosis.

2. A method according to claim 1 wherein distillation of the reverse osmosis permeate is effected at subatmospheric pressure.

3. A method according to claim 2 wherein distillation is effected at a pressure such that separation of the alcohol and volatile flavour components from the permeate takes place at a temperature not greater than about 60° C.

4. A method according to claim 1 wherein distillation is effected in a packed distillation column comprising a rectifying section and a steam tripping section, the permeate being fed to a position intermediate said sections.

5. A method according to claim 1 wherein the reverse osmosis membrane is partially impermeable to alcohol.

6. A method according to claim 1 wherein the reverse osmosis membrane is substantially totally permeable to alcohol.

7. Apparatus for the concentration of beer which comprises means for passing the beer to at least one reverse osmosis cell, said cell being provided with a membrane which will allow the passage of water therethrough and is at least partially permeable to alcohol and volatile flavour components of the beer but is impermeable to dissolved solids, means to convey permeate from said reverse osmosis cell or cells to a distillation apparatus wherein alcohol and volatile flavour components of the beer may be separated from said permeate, and means to combine separated alcohol and volatile flavour components with beer concentrate from said reverse osmosis cell or cells.

8. A beer concentrate prepared according to the method of claim 1.

9. A beer prepared by mixing a concentrate prepared according to the method of claim 1 with water.

* * * * *